(12) United States Patent
Bolt

(10) Patent No.: US 8,504,757 B1
(45) Date of Patent: Aug. 6, 2013

(54) METHOD FOR TRANSLATING VIRTUAL STORAGE DEVICE ADDRESSES TO PHYSICAL STORAGE DEVICE ADDRESSES IN A PROPRIETARY VIRTUALIZATION HYPERVISOR

(71) Applicant: Proximal Data Inc., San Diego, CA (US)

(72) Inventor: Thomas R. Bolt, San Diego, CA (US)

(73) Assignee: Proximal Data, Inc., San Diego, CA (US)

( * ) Notice: Subject to any disclaimer, the term of this patent is extended or adjusted under 35 U.S.C. 154(b) by 0 days.

(21) Appl. No.: 13/783,390

(22) Filed: Mar. 3, 2013

Related U.S. Application Data

(60) Provisional application No. 61/701,682, filed on Sep. 16, 2012.

(51) Int. Cl.
*G06F 12/00* (2006.01)

(52) U.S. Cl.
USPC .............................................. 711/6; 711/103

(58) Field of Classification Search
USPC ...................................... 711/6, 103
See application file for complete search history.

(56) References Cited

U.S. PATENT DOCUMENTS

| 8,386,749 | B2 | 2/2013 | Dannowski et al. |
| 2011/0119669 | A1 | 5/2011 | McRae |
| 2013/0013877 | A1 | 1/2013 | Tian |

*Primary Examiner* — Hashem Farrokh

(74) *Attorney, Agent, or Firm* — Clause Eight IPS; Michael Catania

(57) ABSTRACT

A method to translate virtual storage device addresses to physical storage device addresses without the cooperation of the proprietary virtualization hypervisor is disclosed herein. The method of the present invention allows additional functionality to be added to the I/O processing of a closed/proprietary virtualization hypervisor by third party software or physical storage devices on the basis of individual virtual storage devices.

5 Claims, 3 Drawing Sheets

METHOD FOR TRANSLATING VIRTUAL STORAGE DEVICE ADDRESSES TO PHYSICAL STORAGE DEVICE ADDRESSES IN A PROPRIETARY VIRTUALIZATION HYPERVISOR

CROSS REFERENCE TO RELATED APPLICATION

The Present application claims priority to U.S. Provisional Patent Application No. 61/701,682, filed on Sep. 16, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention generally relates to virtualization hypervisors, and more specifically to proprietary virtualization hypervisors.

2. Description of the Related Art

Virtual storage devices for proprietary hypervisors are typically implemented as files stored within a proprietary file system. These files present a logical address space corresponding to the virtual storage device as offsets or locations within the files that represent the virtual storage device. The proprietary file system within the proprietary hypervisor is responsible for mapping these offsets or locations within the files representing the virtual storage devices to a physical storage location on one of the devices that the proprietary hypervisor is using.

The producers of proprietary hypervisors often are reluctant to allow other companies to modify or add functionality within their core intellectual property and do not provide published/supported mechanisms to do so. These proprietary hypervisors are closed and inaccessible to third party software publishers and physical device manufacturers.

It is desirable for independent software and hardware companies to add unique value to the I/O streams of these closed/proprietary virtualization hypervisors on the basis of individual virtual storage devices.

It is furthermore desirable to provide this additional functionality in a manner that is minimally intrusive such that it introduces minimal chance for destabilization of the proprietary virtualization hypervisor, introduces minimal change to the closed/proprietary virtualization hypervisor, and does not rely upon unpublished, proprietary, or likely to change mechanisms.

There are no known approaches that attempt to solve this problem. In the case of an open source virtualization hypervisor, there are file system primitives available to provide the necessary mapping/translation functions.

Reverse engineering and/or patching of the proprietary virtualization hypervisor may be attempted to provide the necessary translation/mapping functionality. This approach is highly undesirable for technical (and in some cases legal) reasons. This approach is very prone to fail with new releases/version/patches/updates to the proprietary virtualization hypervisor.

General definitions for terms utilized in the pertinent art are set forth below.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

"Cache" refers to the memory in which data is stored in order to make the data more readily and speedily accessible, transparently. When a cache is exhausted, it is flushed of data, to be replaced with the next cache according to a replacement algorithm.

"Cached data" is data in cache memory duplicating original values stored elsewhere (such as the hard disk) on a computer.

"Cache hit" refers to when the processor looks for data in cache memory and finds the data. A cache hit places less strain on input/output (I/O) resources and limited network resources.

"Cache miss" refers to when the processor looks for data in cache memory and finds that it is not there, resulting in having to read from the main memory or hard disk. Data retrieved during a cache miss is often written into the cache in anticipation of further need for it.

"Caching resources" refers to the physical or virtual components of limited availability required for caches or the process of caching, such as memory or a processing unit.

"Cloud computing" is generally defined as using computing resources, primarily servers, owned by a third party provider (such as the AMAZON ELASTIC COMPUTE CLOUD, JOYENT, and GOOGLE APPS) such that the user does not need to make a substantial investment in computer hardware and scale resources depending on the user's needs. Cloud computing primarily involves Web applications but can include storage, raw computing and other specialized services.

Compatibility library is a software program that provides an interface between computer programs, and in particular an interface that provides an interface between a proprietary environment and an open source or GNU GPL device driver that provides the supporting functionality for the device driver.

"Data center" is a centralized location where computing resources (such as, host computers, servers, applications, databases, or network access) critical to an organization are maintained in a highly controlled physical environment.

Device driver is a software program that allows a hardware device to interact with software installed on the hardware device.

"Execution environments" refers to operating systems or virtual machines in which executable programs are executed. When a computer program is executed, or running, a process is created.

Function pointer is a programming language data type that invokes a function in a computer memory.

Functionality is a subroutine of a computer program which performs a specific function, usually as a sequence of program instructions.

GNU, General Public License is a license for an open source operating system based on UNIX, which requires that derived works be distributed under the same license terms.

Hypervisor is a hardware virtualization technique that allows a computer to host multiple operating systems by providing a guest operating system with a virtual operating platform.

I/O (input/output) is the communication between a processing system and the outside.

Kernel is a component of an operating system that connects a computer's software applications to the computer's hardware.

"Load balancing" refers to distributing workload across multiple computers, central processing units, or other resources, to achieve optimal resource utilization, maximize throughput, minimize response time, and avoid overload.

"Logical unit number" or "LUN" is an identification number given to logical units (devices) connected to a SCSI "Small Computer System Interface" adapter; typically, the logical disks in a storage area network (SAN).

"Mass storage devices" refers to removable or non-removable media that can store large amounts of data, such as tape drives, redundant array of independent disks (RAID), magnetic disks, or flash drives.

"Non-volatile caching device" refers to a storage device that can retain data within memory even when the device is not powered on, such as a flash drive.

"Open source software" or "OSS" refers to computer software that is available with open access to the source code (design and implementation), which is typically free.

"Process identifier", "process ID", or "PID" is a number used by operating systems (OS) to uniquely identify a process, an OS object that consists of an executable program, a set of virtual memory addresses, and one or more threads. When a program runs, a process is created.

"Virtualization" refers to a computer software/hardware platform that allows running several operating systems simultaneously on the same computer. VMware vSphere Hypervisor™ (ESXi) is an example of a hardware virtualization product.

"Virtualized environment" refers to hypervisor, or virtualization, systems.

Virtual Machine is a software abstraction of a physical computer.

"Web-Browser" is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

"Web-Server" is a computer able to simultaneously manage many Internet information-exchange processes at the same time. Normally, server computers are more powerful than client computers, and are administratively and/or geographically centralized. An interactive-form information-collection process generally is controlled from a server computer.

Proprietary virtualization hypervisors may not provide mechanisms to translate or map virtual storage device addresses to physical device addresses to third party software publishers or physical device manufacturers. It is highly desirable to be able to map the virtual storage device address to the physical location where data is stored to provide management policies or value added features/functionality to data associated with an individual virtual storage device.

BRIEF SUMMARY OF THE INVENTION

The present invention is a method to translate virtual storage device addresses to physical storage device addresses without the cooperation of the proprietary virtualization hypervisor. This mechanism allows additional functionality to be added to the I/O processing of a closed/proprietary virtualization hypervisor by third party software or physical storage devices on the basis of individual virtual storage devices.

The purpose of this invention is to allow additional functionality to be added to the I/O processing of closed/proprietary virtualization hypervisors by third party software or physical storage devices on the basis of individual virtual storage devices. Examples of such additional functionality include, but are not limited to auto-tiering, class of service, prioritization, storage management policy, and data protection policy.

Proprietary hypervisors often provide integration points for the addition of third party software. Examples of this include physical device drivers, which are often supplied by the manufacturers of the physical devices themselves. These device drivers are typically dynamically loaded and linked into the proprietary hypervisor at run time, such that these device drivers may be developed, maintained, and released independently from the proprietary virtualization hypervisor. Another example of a typical integration point for third party software are filter driver application programming interfaces (APIs), that allow third party software to dynamically link into the I/O processing stack. It is often the case that the filter driver API is implemented for virtual devices and not physical devices, since in a virtualization hypervisor each virtual machine must act independently of all the other virtual machines. As such it would not be acceptable for a third party I/O processing function using the filter driver API to affect virtual machines other than the ones it was specifically configured for.

The present invention is a method for processing an I/O request at both the virtual storage device driver level and the physical storage device driver level, such that the mapping from virtual storage device addresses to physical storage device addresses can be determined without the need for support from the proprietary virtualization hypervisor, and with immunity from changes to the proprietary file system contained within the proprietary virtualization hypervisor.

One aspect of the present invention is a method for translating virtual storage addresses to physical storage device address in a proprietary virtualization hypervisor. The method includes adding functionality at a virtual storage device layer and a physical storage device driver layer. The virtual storage device layer is above a proprietary file system of a proprietary virtualization hypervisor and the physical storage device layer below the proprietary file system of a proprietary virtualization hypervisor. The added functionality records a contextual information of an I/O request as a stored contextual information. The stored contextual information comprises an address within a requested virtual storage device, an identifier of an accessed virtual storage device and an identifier of a virtual machine requesting the access. The method also includes associating the stored contextual information with the I/O request before the I/O request is forwarded for normal processing. The method also includes forwarding the I/O request. The method also includes retrieving the stored contextual information at the physical storage device driver layer from the virtual storage device layer utilizing function association. The method also includes determining a mapping from a virtual storage address space to a physical storage device address space.

The step of associating the stored contextual information with the I/O request preferably comprises storing the contextual information in a plurality of unused portions of the I/O request. Alternatively, the step of associating the stored contextual information with the I/O request comprises adding storage to the I/O request. Alternatively, the step of associating the stored contextual information with the I/O request comprises storing the contextual information separately from the I/O request and embedding a pointer to the stored contextual information. Alternatively, the step of associating the stored contextual information with the I/O request comprises utilizing a lookup function that uses a pre-existing unique identifier. Alternatively, the step of associating the stored contextual information with the I/O request comprises utilizing a lookup function that uses an added unique identifier embedded to the I/O request.

The step of adding functionality at a physical storage device driver layer preferably comprises changing a dynamic data structure at the physical storage device layer to add the functionality.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
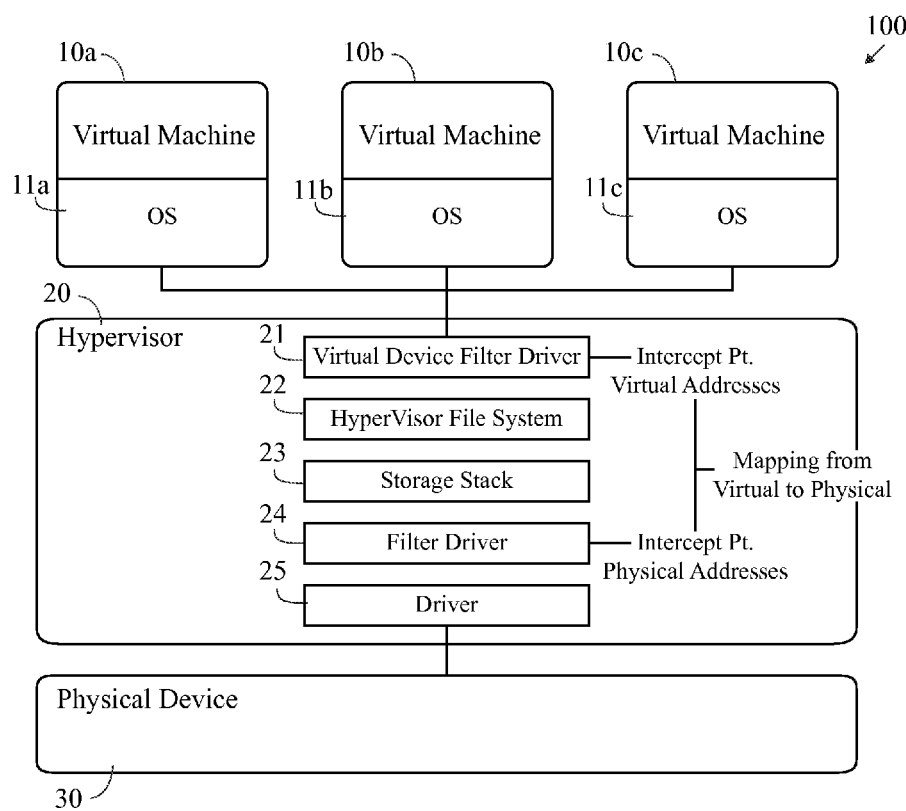
FIG. 1 is a block diagram of a system for translating virtual storage addresses to physical storage device address in a proprietary virtualization hypervisor.

A block diagram block diagram of a system 100 for translating virtual storage addresses to physical storage device address in a proprietary virtualization hypervisor is illustrated in FIG. 1. A first virtual machine 10*a* has a first operating system ("OS") 11*a*. A second virtual machine 10*b* has a second OS 11*b*. A third virtual machine 10*c* has a third OS 11*c*. A proprietary virtualization hypervisor 20 preferably includes a virtual device filter driver 21, a hypervisor file system 22, a storage stack 23, a filter driver 24, and a driver 25. A physical device 30 is below the hypervisor 20.

Figure 3:
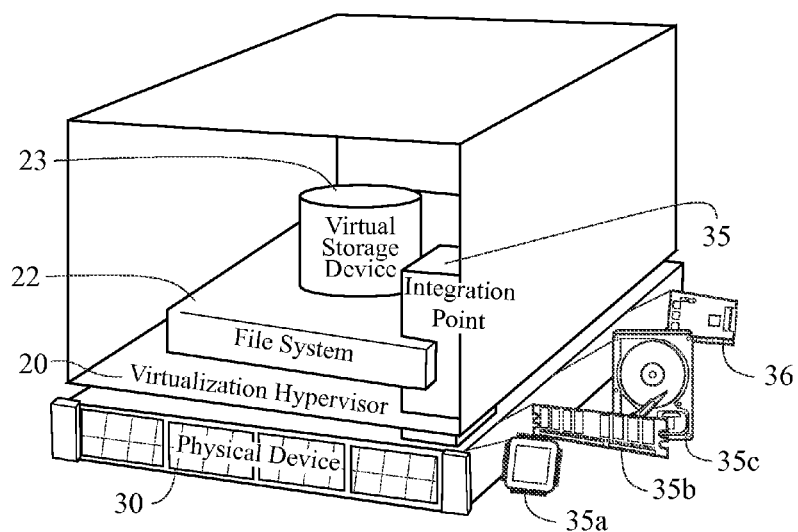
FIG. 3 is an illustration of components of a physical device utilized with translating virtual storage addresses to physical storage device address in a proprietary virtualization hypervisor.

As shown in FIG. 3, the system 100 includes an integration point 35, physical storage devices 35*a*, 35*b*, and 35*c* and I/O request 36. Physical storage device 35*a* is a processor memory/on-chip memory, physical storage device 35*b* is a memory module, and 35*c* is a hard disk drive.

Figure 2:
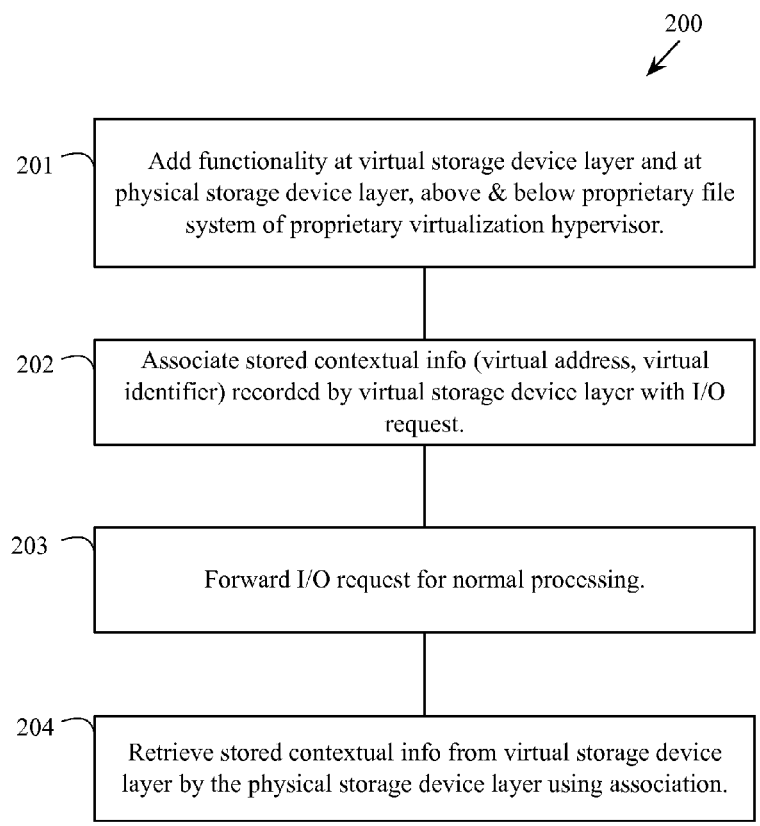
FIG. 2 is a flow chart of a method for translating virtual storage addresses to physical storage device address in a proprietary virtualization hypervisor.

A method 200 for translating virtual storage addresses to physical storage device address in a proprietary virtualization hypervisor is shown in FIG. 2. At block 201, functionality is added at a virtual storage device layer 10*a* and a physical storage device driver layer 30. The virtual storage device layer 10*a* is above a proprietary file system of a proprietary virtualization hypervisor 20 and the physical storage device layer 30 is below the proprietary file system of a proprietary virtualization hypervisor 20. The added functionality records a contextual information of an I/O request as a stored contextual information. The stored contextual information comprises an address within a requested virtual storage device, an identifier of an accessed virtual storage device and an identifier of a virtual machine requesting the access. At block 202, the stored contextual information is associated with the I/O request before the I/O request is forwarded for normal processing. At block 203, the I/O request is forwarded for normal processing. At block 204, the stored contextual information is retrieved at the physical storage device driver layer from the virtual storage device layer utilizing function association. This allows third party software or physical storage devices to determine a mapping from a virtual storage address space to a physical storage device address space.

A preferred implementation of the method for translating virtual storage addresses to physical storage device address in a proprietary virtualization hypervisor comprises adding functionality at the virtual storage device layer (virtual machine 10*a*) which is above the proprietary file system of the proprietary virtualization hypervisor 20 and at the physical storage device layer 30 which is below the proprietary file system of the proprietary virtualization hypervisor 20. The functionality added at the virtual storage device layer 10*a* is ideally added by using an API of the virtual storage device filter driver 21, however other means may be employed such as dynamic linking or patching of code.

The additional functionality added at the virtual storage device layer 10*a* is responsible for recording the contextual information of the I/O request as stored contextual information. The stored contextual information comprises an address within the requested virtual storage device 10*a*, an identifier of the accessed virtual device and preferably an identifier of the virtual machine that is requesting the access. The additional functionality then associates the stored contextual information with the I/O request before forwarding the request on for normal processing. This association is preferably direct, such as storing the contextual information in unused portions of the request or adding storage to the request for this purpose.

Alternatively, the association is indirect, by storing the contextual information separately from the request and embedding or attaching a pointer or reference to the stored data of some type to the I/O request before forwarding the request on for normal processing.

Yet in another alternative embodiment, the association is made by use of a lookup function that utilizes either a pre-existing unique identifier (such as a request serial number or physical memory address) or an added unique identifier embedded or added to the I/O request. The lookup function uses the unique identifier to associate an I/O request with the stored contextual information by any of a multitude of algorithms.

The additional functionality at the physical storage device driver layer 30 then retrieves the stored contextual information from the virtual storage device layer using the direct, indirect, or lookup function association outlined above. The I/O request received by the physical storage device driver will have been translated to physical storage device addresses, and these addresses are correlated to the stored virtual storage device addresses.

The functionality added at the physical storage device layer 30 is ideally added by changing the dynamic data structure used to perform dynamic linking and may be performed at run time without any code modifications to the proprietary virtualization hypervisor 20 or the physical device drivers, however other means may be employed such as modification of the device drivers or patching of code.

The present invention allows for either third party software functionality or storage device drivers to ascertain the mapping from the virtual storage device address space to the physical storage device address space. This ability to map physical storage device addresses back to the virtual storage device address allows functionality to be implemented at the physical storage device layer based on what virtual storage device is being accessed by the I/O request.

An alternative embodiment has a virtual storage device driver layer that does not need to record the context of the original I/O request at all and registers a completion callback function for the I/O request before passing the request on for normal processing. The physical storage device driver layer records the physical device addresses associated with the request, and upon completion of the I/O request, the completion callback function correlates the physical device addresses stored by the physical device driver layer with the context of the virtual device request.

In yet another alternative embodiment, both the virtual storage device driver layer and the physical storage device driver layer store their respective address information and contextual information. Either the physical storage device driver layer or a callback completion routine of the virtual device driver layer correlates the two address spaces.

In the alternative embodiments, any of several methods are used to directly, indirectly or functionally associate address information and context information with the I/O request. Each I/O request for the virtual storage device records the virtual storage device address and contextual information. Subsequently the proprietary file system within the proprietary virtualization hypervisor 20 translates these addresses and creates physical storage device requests. The physical device driver layer 20 correlates the physical addresses of the request to the virtual storage device address by looking up the stored information associated with the request prior to processing by the proprietary file system of the virtualization hypervisor 20. If a new version of the proprietary file system of the virtualization hypervisor 20 changes the mapping function, the change will be transparent to the operation of the method of the present invention and the new mapping/translation will be performed.

Another advantage is minimal invasiveness. The preferred embodiment of this mechanism requires two points to be intercepted, a point within the virtual device driver space such as a virtual device filter driver and a point within the physical device driver space. Other embodiments may require more or less interception points.

Another advantage is that the present invention does not require modification to device drivers. Since physical device drivers are dynamically loaded and linked at run time within proprietary virtualization hypervisors, it is possible to dynamically link enhanced I/O processing by intercepting the indirect function calls required by dynamic linking. This involves only dynamic data structure changes that may be performed at run time without any code modifications to the proprietary virtualization hypervisor or the physical device drivers.

The present invention provides a translation/mapping of virtual storage device addresses to physical storage device addresses with immunity to revisions, fixes, patches, and changes to the proprietary file system that determines the mapping of virtual storage device addresses to physical storage device addresses.

The present invention may be implemented as a computer readable medium embodying program computer instructions (e.g., C, C++, Java, Assembly languages, .Net, Binary code) run by a processor for causing a computing device (such as a server, desktop computer, laptop computer, smartphone, tablet computer, or the like) to perform the method steps of the present invention.

The present invention may be utilized in whole or in part with the inventions of the following patent applications. Bolt, U.S. patent application Ser. No. 13/489,441, filed on Jun. 5, 2012, is hereby incorporated by reference in its entirety. Bolt, U.S. patent application Ser. No. 13/489,428, filed on Jun. 5, 2012, is hereby incorporated by reference in its entirety. Bolt et al., U.S. patent application Ser. No. 13/775,164, filed on Feb. 23, 2013, is hereby incorporated by reference in its entirety. Bolt, U.S. patent application Ser. No. 13/775,214, filed on Feb. 24, 2013, is hereby incorporated by reference in its entirety. Bolt, U.S. patent application Ser. No. 13/672,732, filed on Nov. 9, 2012, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention:

1. A method for translating virtual storage addresses to physical storage device address in a proprietary virtualization hypervisor, the method comprising:
adding functionality at a virtual storage device layer and a physical storage device driver layer, the virtual storage device layer above a proprietary file system of a proprietary virtualization hypervisor and the physical storage device layer below the proprietary file system of a proprietary virtualization hypervisor, the added functionality recording a contextual information of an I/O request as a stored contextual information, the stored contextual information comprising an address within a requested virtual storage device, an identifier of an accessed virtual storage device and an identifier of a virtual machine requesting an access;
associating the stored contextual information with the I/O request before the I/O request is forwarded for normal processing, and forwarding the I/O request;
retrieving the stored contextual information at the physical storage device driver layer from the virtual storage device layer utilizing function association; and
determining a mapping from a virtual storage address space to a physical storage device address space.

2. The method according to claim 1 wherein the associating the stored contextual information with the I/O request comprises storing the contextual information separately from the I/O request and embedding a pointer to the stored contextual information.

3. The method according to claim 1 wherein the associating the stored contextual information with the I/O request comprises utilizing a lookup function that uses a pre-existing unique identifier.

4. The method according to claim 1 wherein the associating the stored contextual information with the I/O request comprises utilizing a lookup function that uses an added unique identifier embedded to the I/O request.

5. The method according to claim 1 wherein adding functionality at a physical storage device driver layer comprises changing a dynamic data structure at the physical storage device layer to add the functionality.

* * * * *